United States Patent
Gautier

(10) Patent No.: US 6,901,843 B2
(45) Date of Patent: Jun. 7, 2005

(54) COMPRISED AIR BRAKE BOOSTER WITH ENHANCED POWER-RESIST

(75) Inventor: Jean-Pierre Gautier, La Roche Derrien (FR)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 10/433,631

(22) PCT Filed: Nov. 26, 2001

(86) PCT No.: PCT/FR01/03736

§ 371 (c)(1), (2), (4) Date: Jun. 3, 2003

(87) PCT Pub. No.: WO02/44001

PCT Pub. Date: Jun. 6, 2002

(65) Prior Publication Data

US 2004/0159516 A1 Aug. 19, 2004

(30) Foreign Application Priority Data

Nov. 28, 2000 (FR) ............................................. 00 15466

(51) Int. Cl.⁷ ................................................. F15B 9/10
(52) U.S. Cl. ...................................................... 91/369.2
(58) Field of Search ......................................... 91/369.2

(56) References Cited

U.S. PATENT DOCUMENTS 4,086,842 A * 5/1978 Kytta ......................... 91/369.2
4,242,943 A * 1/1981 Nakamura et al. ......... 91/369.2

* cited by examiner

Primary Examiner—F. Daniel Lopez
(74) Attorney, Agent, or Firm—Leo H. McCormick, Jr.; Warren Comstock

(57) ABSTRACT

A brake booster having a movable partition (6) through which an output force is carried through a first reaction device (24,25) to a brake system in response to an input force applied to a brake rod (9). A second reaction device (29–34) is located between the brake rod (9) and the first reaction device (24,25) and includes a first spring (34) that is compressed by a predetermined reaction force and the input force such that any further input force is carried through a second spring (32) into the movable partition (6) to provide and additional force in the development of an output farce corresponding to a desired a brake application.

7 Claims, 2 Drawing Sheets

COMPRISED AIR BRAKE BOOSTER WITH ENHANCED POWER-RESIST

Figure 1:
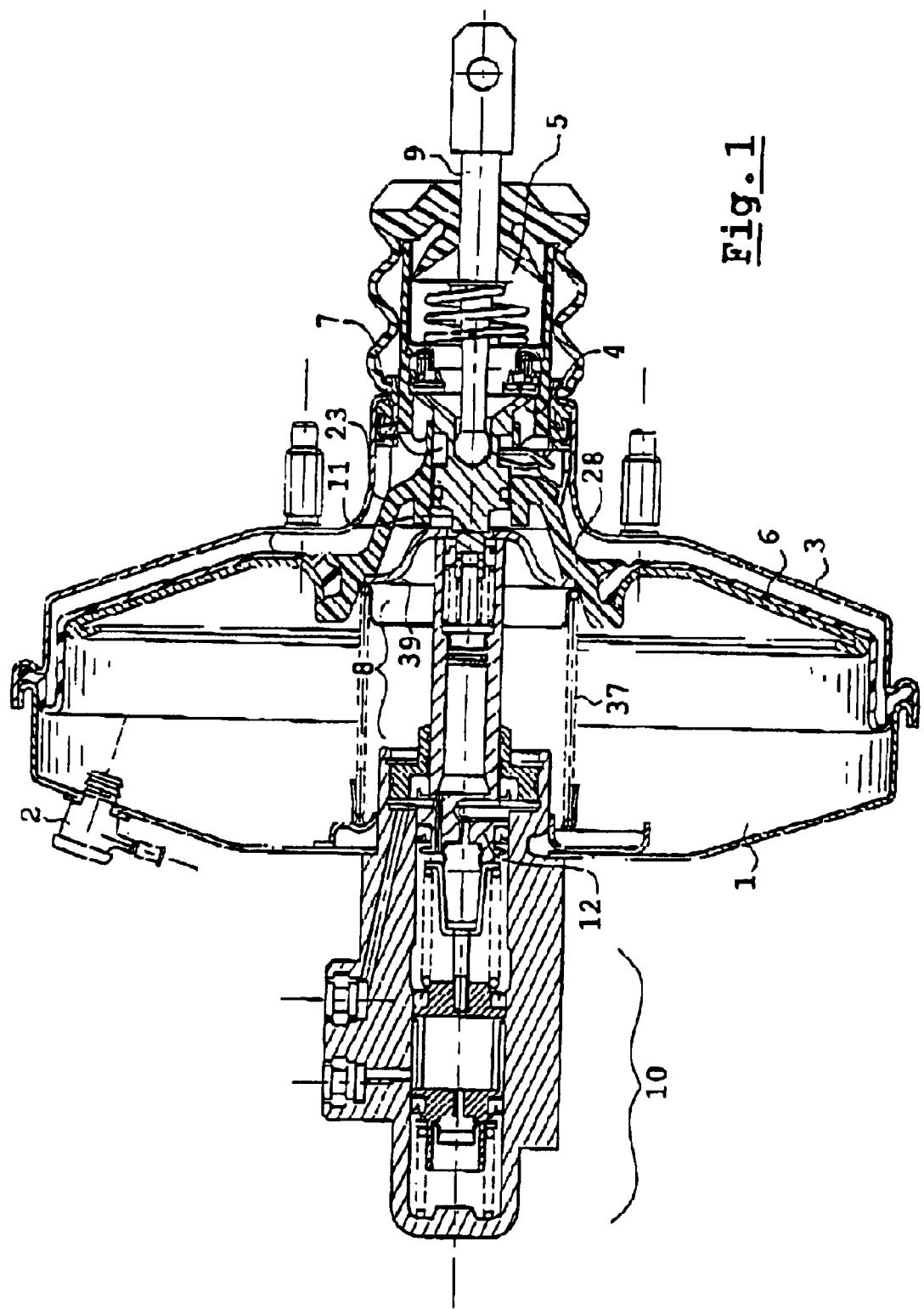

The subject of the present invention is a pneumatic brake-booster with an enhanced boost effect. It is also an object of the invention to provide greater boosting in the event of heavy braking. It relates to pneumatic brake-boosters, the braking law of which has a point of inflection when passing from normal braking, for which boosting is normal, to heavy braking, for which boosting needs to be greater, with, furthermore, additional boosting.

A pneumatic brake-booster comprises, in principle, a variable-volume front chamber separated from a rear chamber, the volume of which is also variable, by a partition formed by a sealed and flexible diaphragm and by a rigid skirt plate. The rigid skirt drives a pneumatic piston bearing, via a push rod, on a primary piston of a master cylinder of a hydraulic braking circuit, typically a tandem master cylinder. The front chamber, on the master cylinder side, is connected pneumatically to a source of vacuum. The rear chamber, on the opposite side to the front chamber, and placed on the brake pedal side, is connected pneumatically in a way controlled by a valve, to a source of driving fluid, typically air at atmospheric pressure. At rest, that is to say when a driver is not pressing on the brake pedal, the front and rear chambers are connected together by a first valve, whereas the rear chamber is isolated from atmospheric pressure by a second valve. Under braking, the front chamber is first of all isolated from the rear chamber by closing the first valve, then air is let into the rear chamber by opening the second valve. This letting-in of air has the effect of driving the partition and of providing pneumatic boosting of the braking.

The force of a driver, transmitted by a brake pedal, and the force of the brake-booster combine in the pneumatic brake-booster on a reaction disk. On this disk, these two forces are applied to two adjacent surfaces, generally concentric, in fixed proportions (thus setting a constant brake boosting ratio). The disk is also in reaction, particularly via a cup which contains it, with a reaction force exerted by a hydraulic braking circuit located downstream of the transmission of the forces.

The problems encountered under braking, particularly under heavy braking, are associated with driver behavior. What happens is that if braking has to be heavy, the brake boosting in effect needs to be great. For example, a proportion between a (significant) force applied by a driver and the force applied correspondingly by a pneumatic brake-booster on a hydraulic brake operator has therefore to have a high value, for example higher than ten. By contrast, particularly in the context of vehicles driving through city traffic, such a high value leads to a jolting ride which is unpleasant for the passengers and for the driver. There are then two conceivable solutions.

Either the proportionality ratio adopted for braking is some way between a low ratio, which is useful for easily metering low braking forces, and a high ratio, which is useful when braking is heavy. Such a solution is not satisfactory because it is not really suited to either of the two situations. Or, on the other hand, the brake boosting is modified, particularly by adding additional hydraulic boosting, so as to provide the braking, above and beyond a certain braking force, with a boosting proportionality which is higher than the proportion used when the force is low. In the latter case, a boost curve showing the force applied to a downstream hydraulic braking circuit as a function of the force applied by a driver has a point of inflection above and beyond a certain value of this driver force: its slope becomes steeper. This curve then experiences a known boost saturation effect which is encountered when the moving partition is brought as far as possible into the front chamber and or when the rear chamber is raised to the highest pressure available (that of the ambient air). The second solution has the disadvantage of entailing the development of pneumatic brake-boosters of new design, and of not being able to be fitted to pneumatic brake-boosters which have already been produced. It is also known that developing a new solution leads to a period of development and homologation, the duration and cost of which are not insignificant. Furthermore, the complexity of the new solution may in itself be a factor in high additional costs.

The invention seeks to solve these problems by creating a simple mechanical relay. Quite simply, above and beyond a certain braking force, provision is made for moving gear that transmits the braking force (at least one of its parts) to be deformed so that this gear comes to bear against the partition at a point other than via the reaction disk. By proceeding in this way, at the time of this additional bearing, the proportionality ratio fixed by the ratio of the surface areas is broken. In so doing, two functions can be fulfilled using one and the same mechanism. A first function is that of detecting above and beyond what given value of the force applied by the driver the greater boosting needs to be implemented. Another function is that of fixing, using this mechanism, another proportionality ratio which is better for heavy braking.

One principle of the invention may involve the use of the compressible nature of the reaction disk. What happens is that under conventional boosted braking, the reaction disk becomes deformed under the effect of the braking. The crushing of the various surfaces of the disk leads to the opening and closing of one or other of the valves so that the forces can reach equilibrium in the desired proportion. However, even though the disk acts like a fluid subjected to equal pressures on its surfaces (which fixes the proportionality ratio), it does not need to be made of a noncompressible material, and in actual fact it is not: it is made of a compressible material, for example rubber.

As a result, when the disk is compressed, the moving gear is deformed (broadly speaking contracts). In particular, a reaction cup which contains the reaction disk moves (in relative terms) in the direction of the brake pedal. In the invention, it may be decided, for a given compression value, to cause the brake-booster to absorb some force. In other words, when a brake rod carried along by the brake pedal or the push rod are depressed by an amount $\delta$ (corresponding to the force for which the boost ratio is to be increased), the moving partition is depressed by an amount $\delta-\epsilon$, with $\epsilon$ small and of no consequence on the dynamics of the braking. This difference $\epsilon$ is then used to cause the moving partition to come into additional bearing contact against the push rod of the moving gear.

The moving partition then acts on the moving gear in two ways and these two actions combine their forces. On the one hand, in a conventional way, the reaction disk drives the moving gear along. On the other hand, the absorbed force supplements the thrust.

For this additional thrust to be filled, however, as a progressive force by the driver, provision is also made for a proportional reaction to be integrated, this having the same effects as those produced by the disk. What happens is that if such a proportional reaction were not provided, then above and beyond a certain force on the part of the driver, braking would be imposed only by the position of the foot of this driver (without additional force). This could result in erratic braking.

A subject of the invention is therefore a pneumatic brake-booster comprising:
- a front chamber that can be connected to a source of vacuum,
- a rear chamber that can be connected to a high-pressure inlet;
- a sealed moving partition between the two chambers,
- a brake rod,
- a hydraulic braking circuit,
- a moving gear, this moving gear being carried along, on the one hand, via a first reaction device, via the moving partition and via the brake rod, and, on the other hand, being in reaction, via the first reaction device, with the hydraulic braking circuit, and
- a device for letting a high-pressure fluid into the rear chamber at the time of braking, characterized in that it comprises:
- a second reaction device for carrying the moving gear along via the moving partition.

Figure 2A:
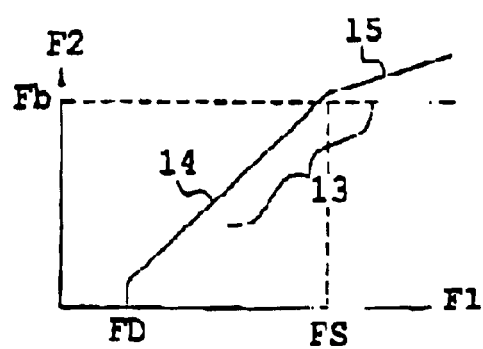
Figure 2B:
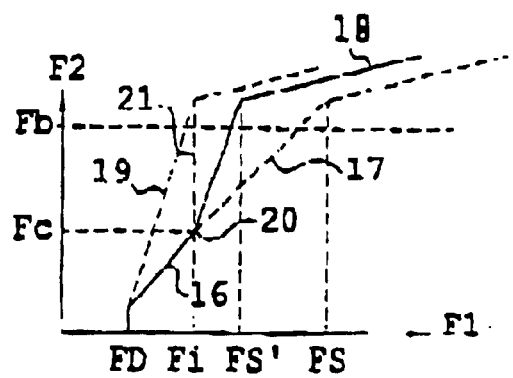
Figure 3B:
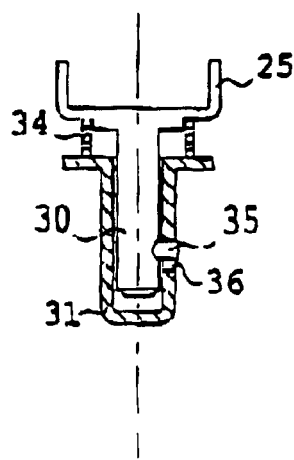
Figure 3A:
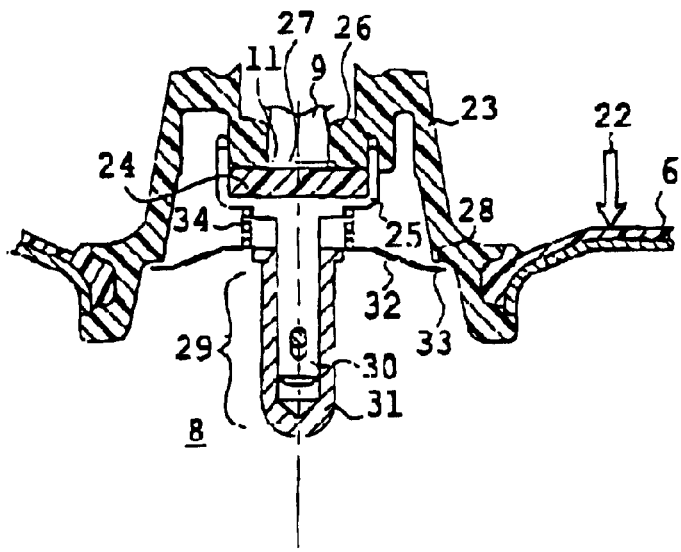

The invention will be better understood upon reading the description which follows and from examining the accompanying figures. These are given only by way of non-limiting indication of the invention. The figures show:

FIG. 1: overall view in section of a pneumatic brake-booster according to the invention;

FIGS. 2a and 2b: curves representing the braking forces with conventional pneumatic boosting and in the invention, respectively;

FIGS. 3a and 3b: sections of a preferred alternative form of embodiment of the pneumatic brake-booster of the invention, in two mutually perpendicular orientations.

FIG. 1 shows a pneumatic brake-booster with enhanced boost effect according to the invention. This pneumatic brake-booster comprises a front chamber 1 that can be connected by a plug 2 to a source of vacuum, not depicted. Typically, the source of vacuum may consist of an inlet gas tapping for a vehicle with a petrol engine. In the case of a vehicle with a diesel engine, use would be made of an external source of vacuum. The pneumatic brake-booster also comprises a rear chamber 3 that can be connected, for example by a valve 4, to a high-pressure inlet 5 (typically air at ambient pressure). The pneumatic brake-booster also comprises a moving partition 6 habitually equipped with a rigid skirt and with a sealed diaphragm. The diaphragm prevents pneumatic communication between the two chambers. The partition 6 is pierced with a sealed orifice 7 to allow a moving gear 8 to pass. The moving gear 8 is connected mechanically, on the one hand, by a brake rod 9 to a brake pedal and, on the other hand, to a hydraulic braking circuit 10. The principle of the boosting afforded by such a pneumatic brake-booster is as follows. Under the action of the rod 9, the moving gear 8 plunges into the rear chamber, uncovering the valve 4 via which ambient air is let into the rear chamber 3. The ambient air then exerts pressure on the partition 6 which, in addition to the action of a thrust face 11 secured to the rod 9, drives the moving gear 8 in such a way that one end 12 thereof actuates the hydraulic braking circuit 10.

Such a system is known and leads to a braking law, curve 13 in FIG. 2a, in which a force F1 applied by a driver to the rod 9 is echoed in a force F2 applied by the moving gear to the hydraulic braking circuit 10. The curve 13 shown indicates that above and beyond a threshold force Fs, the brake boosting effect follows a correspondence law 14. It also shows that above and beyond a force FS, known as the saturation force, the brake boosting effect produced by the pneumatic brake-booster then merely follows a correspondence law 15 because the moving partition 6 can no longer move in the direction of the front chamber 1, either because it has reached the limit of this chamber or rather because the rear chamber 3 is completely subjected to atmospheric pressure. In a known way, the saturation force has to be situated above and beyond a force Fb applied to the hydraulic circuit for which the vehicle wheels lock up. The value of the force Fs is set by choices corresponding to driver comfort, in particular allowing him to rest his foot on the brake pedal without braking. The boost slope 14 for a conventional pneumatic brake-booster is linear and depends essentially on respective surface areas over which the brake rod and the moving partition bear on a reaction disk.

By comparison, FIG. 2b shows the improvement afforded by the invention. The curve giving the correspondence between the force applied by the driver and the force applied to the hydraulic circuit experiences a first evolution 16 comparable with the evolution 14 of curve 13. However, above and beyond a given force value Fi which is intermediate between the threshold force Fs and the saturation force FS, the mechanism of the invention provides additional boosting so that the boost slope comprises a much more angled segment 17. As a result, the saturation force FS' encountered with the device of the invention is far lower than the saturation force FS of the conventional solution. Above and beyond the saturation force FS', the correspondence curve has a segment 18 similar to the segment 15. It will be seen later on how it is possible to adjust the value of the intermediate force Fi.

This adjustment leads to the creation of a segment 16 and a segment 17 or, in some cases, for example for sports cars, to the offering, from the outset, of boosting, the slope 19 of which is the same as that of the segment 17. Where segments 16 and 17 meet there is a point of inflection 20 at which the boost force increases proportionately far more swiftly.

The additional balanced reaction mechanism preferably added by the invention is intended to prevent the slope 17 from becoming infinite (in practice far too steep) along a vertical line 21. To give a concrete example, the proportionality ratio for the segments 14 and 16 may be allowed to be of the order of four to six, whereas in the case of the segments 17 or 19 it could reach a ratio higher than ten.

FIG. 3a shows a detail of a first known reaction device and, according to the invention, a second reaction device. The moving gear 8 is carried along by the moving partition 6 by the effect 22 of air at atmospheric pressure let in through the valve 4. The partition 6 bears, via a hollow pneumatic piston 23, against a flexible disk 24. The disk 24 is contained in a cup 25 perfectly tailored to its shape. The piston 23 has the overall shape of a bell. The partition 6 bears against the exterior base of the bell, and the top of the piston 23 is pierced and has an interior peripheral ring 26 which bears on the disk 24 at the interior periphery of the cup 25. One end 27 of the brake rod 9 presses exactly inside the ring 26. The end 27 forms the thrust face 11. The ring 26 and the end 27 are such that between them they occupy all of the space inside the cup 25.

The disk 24, acting like a fluid, allows the (very minimal) relative displacement of the end 27 with respect to the base of the ring 26 to be organized. Under braking, the end 27 first of all penetrates the disk 24, which is flexible. In doing so, the valve 4 at the rear of the pneumatic brake-booster opens, air enters the rear chamber 3. Via the partition 6, the piston 23 presses in its turn against the disk 24. This phenomenon occurs until such time as the bearing forces once again reach equilibrium. When this equilibrium is reached, the disk is flat. As long as it is not reached, the valve 4 remains open and boosting occurs. In practice, for each moment of the braking, along the segment 14 or along the segment 16, the forces applied by the end 27 and by the ring 26 reach equilibrium because of the plasticity of the disk 24. The result then obtained is that, on the one hand, at the time of braking, this end 27 and this ring 26 are almost always at the same place one with respect to the other and that, overall, the cup 25 is pushed in the direction of the hydraulic circuit 10. The slope of the segments 14 and 16 is linked by the proportion of the surface areas of the cross sections of the ends 27 and of the base of the ring 26, respectively. As this proportion does not vary at all throughout braking, it will be understood that boosting is linear.

In the invention, in addition to the first reaction device consisting of the disk 24, a second reaction device is created which will allow another equilibrium between additional (far greater) boosting and the forces applied to the brake rod (in this case also boosted by the first reaction device). To achieve this, the piston 23 has, inside the bell, a circular thrust face 28 forming a ledge. The moving gear 8 therefore comprises, in the preferred exemplary embodiment, a slide 29 formed of a plunger 30 and of an envelope 31. The plunger 30 is solidly fixed to the base of the cup 25. It extends from this cup in the direction of the hydraulic circuit 10. The envelope 31 envelopes the plunger, drives the moving gear in the downstream direction, and at its base has a saucer 32, the peripheral ends 33 of which can bear against the ledge 28. At rest, there is a small clearance between the ends 33 and the ledge 28. Also placed, in compression, between the envelope 31 and the cup 25 is a helical spring 34. The spring 34 surrounds the plunger 30. Because of the action of this spring 34, the plunger 30 is normally expelled from the envelope 31.

To simplify the assembly of the parts, provision is therefore made for the plunger 30, FIG. 3b, to be fitted with a peg 35 which protrudes into a slot 36 made in the envelope 31. As the spring 34 is in compression, the peg 35 bears against the base of the slot 36.

The helical spring 34 is compressed between the saucer 32 and the cup 25 with a force Fc (FIG. 2b) corresponding to the intermediate force Fi for which the intervention of the additional pneumatic boosting is to be set. In other words, for any action applied by a driver, the force of which is below the intermediate force Fi, the assembly consisting of the plunger 30, the envelope 31 and the spring 34, behaves rigidly. The force from the driver and the boost force are therefore transmitted to the hydraulic circuit along the segment 16.

As soon as the force applied by the driver becomes higher than the force Fi, the spring 34 is no longer held by the peg 35 in the slot 36 but on the other hand is compressed by the braking force on the one hand and by the reaction of the hydraulic circuit, on the other hand. Being compressed beyond the force Fc, the spring 34 shortens and the periphery 33 of the saucer 32 comes to bear against the ledge 28. In so doing, the boosting contribution is afforded, on the one hand, by the ring 26 (as before) but also by the saucer 32 through the bearing of the ledge 28.

It may be, once a small clearance, for example, of one millimeter or half a millimeter present between the periphery 33 and the ledge 28 (corresponding to the clearance of the peg 35 in the slot 36) has been taken up, that any additional action applied by the driver on the brake pedal and therefore on the end 27 leads to a corresponding movement of the saucer 32, of the envelope 31 and therefore accordingly of the moving gear as a whole. In this case, the additional braking would be afforded with a zero (or practically zero) marginal force. If this approach were taken, the additional boosting would then have the slope of the half straight line 21 in FIG. 2b. That could be too steep. It will be noted that if there is nonetheless the desire to adopt such a solution, all that would be needed would be for the mechanism to be assembled without the spring 34, without the plunger and without the envelope, and with simply a saucer 32 fixed to the moving gear and for the compression of the disk 24 to be used to lead to the saucer 32 being moved closer to the ledge 28.

In the invention, it has been preferable to provide additional pneumatic boosting of which the slope, while being far steeper, is not exaggerated. To this end, the saucer 32 is slightly flexible and behaves, inserted between the envelope 31 and the ledge 28, like a spring. The slope of the segment 17 is therefore equal to the ratio between the stiffness of the spring equivalent to the saucer 32 and the stiffness of the spring 34 (or of the spring 34 and of a spring equivalent to the compressibility of the disk 34).

To give a concrete example, the force Fi applied by a driver is of the order of 100 kilos. The boosting afforded by the ring 26 alone is of the order of 3000 DaN, leading to a force applied at the master cylinder Fc of the order of 4000 DaN. It may therefore be allowed that for a force only very slightly higher applied by the driver, for example 1100 DaN (100 DaN more), the force transmitted by the cup 25 is 4400 DaN (3300 DaN plus 1100 DaN) and that the force transmitted by the saucer 32 is 1200 DaN. In this case, the slope of the segment 17 would correspond to a force ratio of 15. In this example, the compression of the spring 34 would be of the order of 4000 DaN. Furthermore, the stiffer the saucer 32, the steeper the slope 17.

With the height of the slot 36, the diameter and force of the spring 34, the stiffness of the saucer 32 and the compressibility of the disk 24, there are various ways of adjusting both the value of the intermediate force Fi above and beyond which additional boosting will come into play and the slope 17 of this additional pneumatic boosting. Of course, it will be noted (FIG. 1) that the bell-shaped piston 23 of the state of the art already had a ledge 28 which in practice was used to hold a spring 37 for returning the partition 6 to move the latter away from the front chamber at the time of brake release. Furthermore, saucers such as 32 were already provided in the state of the art. However, these were used only to keep the various parts of the moving gear more or less aligned. By comparison with the known solutions in the state of the art, the invention now introduces the idea of the clearances between the saucer 32 and the ledge 28 and the thrust faces 11 of the end 27 of the rod 9 on the moving gear no longer being left independent of one another but designed so that forces can be absorbed. In practice, with the preferred solution adopted, the invention may consist in replacing an upstream end of the moving gear 8 with the slide 29 bearing via the spring 34 on the back of the cup 25. Such modifications are entirely compliant with the known embodiments and do not lead to tricky development or homologation work.

It will be noted that the spring 34 and the spring formed by the saucer 32 are inserted in series between the moving partition 6 and the first reaction device consisting of the cup 25. The second reaction device formed by the envelope 31 is connected, on the one hand, to the midpoint of the two springs in series and, on the other hand, exerts its force on the hydraulic braking circuit.

What is claimed is:

1. A pneumatic brake-booster comprising:
   a casing having a front chamber (1) connected to a source of vacuum (2) and a rear chamber (3) selectively connected to a high-pressure inlet (5);
   a sealed moving partition (6) located between said front chamber and said rear chamber to provide an output force;
   a brake rod (9);
   a hydraulic braking circuit (10) for receiving said output force to effect a brake application;

a first reaction device (24, 25) carried by said moving partition (6) for receiving a reaction force from said hydraulic braking circuit (10) during a brake application;

a moving gear (8) being located between said first reaction device (24,25) and said hydraulic braking circuit (10)

a device (4) through which a high-pressure fluid is communicated into the rear chamber (3) to move said sealed moving partition (6) and effect a desired brake application; and a second reaction device (29–34) for carrying the moving gear (8) along with the moving partition (6) and characterized by first spring (34) and a second spring (32) that are located in series between said hydraulic braking circuit (10) and the first reaction device (24,25), said moving gear (8) being mechanically connected to said second reaction device (29–34) such that during a brake application a reaction force received by said first reaction device (24,25) opposes an input force applied to said brake rod (9) by being communicated through said first spring (34) until a predetermined reaction force compresses said first spring (34) and said second spring (34) is moved into engagement with said moving partition (6) such that a portion of said input force is directed into the moving partition (6) such that the corresponding output force is increased to effect said desired brake application.

2. The booster according to claim 1, characterized in that the said first and second springs have stiffnesses which are set so that intervention of the second reaction device occurs for a force (Fi) the value of which is intermediate between a threshold force (Fs) for triggering boosting by the first device and a saturation force (FS).

3. The booster according to claim 1, characterized in that the first spring is helicoidal and the second spring being formed by a saucer.

4. The booster according to claim 3, characterized in that, at rest, the saucer is separated from the partition by a clearance.

5. The booster according to claim 1, characterized in that the moving gear is connected to said first and second reaction devices via a slide (29).

6. The booster according to claim 5, characterized in that the slide comprises a plunger (30) connected rigidly to the first reaction device and an envelope (31) connected to the saucer (32) and to the moving gear.

7. The booster according to claim 6, characterized in that the plunger (30) includes a protruding peg (35) and in that the envelope (31) has a slot (36) to allow said peg to pass and to keep the moving plunger in position with respect to said casing.

* * * * *